(12) United States Patent
Sugita et al.

(10) Patent No.: US 11,004,190 B2
(45) Date of Patent: May 11, 2021

(54) WORKPIECE IMAGE GENERATION DEVICE FOR GENERATING SURFACE IMAGE OF MACHINED WORKPIECE

(71) Applicant: FANUC Corporation, Yamanashi (JP)

(72) Inventors: Yuuki Sugita, Yamanashi (JP); Hang Cui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 197 days.

(21) Appl. No.: 16/257,120

(22) Filed: Jan. 25, 2019

(65) Prior Publication Data

US 2019/0236770 A1    Aug. 1, 2019

(30) Foreign Application Priority Data

Jan. 30, 2018    (JP) .............................. JP2018-014043

(51) Int. Cl.
*G06T 5/00* (2006.01)
*G06T 3/40* (2006.01)
*G06T 7/00* (2017.01)
*G06T 7/10* (2017.01)

(52) U.S. Cl.
CPC .......... *G06T 7/0004* (2013.01); *G06T 3/4038* (2013.01); *G06T 5/008* (2013.01); *G06T 7/10* (2017.01); *G06T 2207/10152* (2013.01); *G06T 2207/20021* (2013.01); *G06T 2207/20212* (2013.01); *G06T 2207/20221* (2013.01); *G06T 2207/30164* (2013.01)

(58) Field of Classification Search
None
See application file for complete search history.

(56) References Cited

U.S. PATENT DOCUMENTS

| 6,292,593 | B1 | 9/2001 | Nako et al. |
| 2011/0102742 | A1* | 5/2011 | Miyasa .............. G01B 9/02068 |
| | | | 351/206 |
| 2011/0188779 | A1 | 8/2011 | Sakanaga et al. |

(Continued)

FOREIGN PATENT DOCUMENTS

| JP | H5-292503 A | 11/1993 |
| JP | H1093808 A | 4/1998 |

(Continued)

*Primary Examiner* — Idowu O Osifade
(74) *Attorney, Agent, or Firm* — Hauptman Ham, LLP (57) ABSTRACT

A workpiece image generation device is provided with a machining information acquisition unit, an area division unit configured to virtually divide a surface area of the workpiece into partial areas based on the surface shape information, an image acquisition unit configured to acquire a plurality of images of the workpiece captured with different angles of irradiation on the workpiece as viewed from the imaging device, an area image selection unit configured to extract partial images individually from the plurality of images of the workpiece, based on the partial areas of the surface area of the workpiece, and select partial images corresponding to the individual partial areas from the plurality of extracted partial images, an image synthesis unit configured to generate a composite image of the workpiece obtained by synthesizing the partial images, and a composite image output unit configured to output the composite image of the workpiece.

12 Claims, 5 Drawing Sheets

(56) References Cited

U.S. PATENT DOCUMENTS

| | | | |
|---|---|---|---|
| 2014/0092215 A1* | 4/2014 | Hayama | A61B 1/00045 348/45 |
| 2014/0172151 A1 | 6/2014 | Niwa et al. | |
| 2015/0049950 A1* | 2/2015 | Jang | G06T 7/97 382/190 |

FOREIGN PATENT DOCUMENTS

| | | | |
|---|---|---|---|
| JP | 2003-130993 A | 5/2003 |
| JP | 2010079387 A | 4/2010 |
| JP | 2011163766 A | 8/2011 |
| JP | 2014115108 A | 6/2014 |
| JP | 2014134856 A | 7/2014 |
| WO | 2014097371 A1 | 6/2014 |

* cited by examiner

WORKPIECE IMAGE GENERATION DEVICE FOR GENERATING SURFACE IMAGE OF MACHINED WORKPIECE

RELATED APPLICATIONS

The present application claims priority from Japanese Application Number 2018-014043, filed Jan. 30, 2018, the disclosure of which is hereby incorporated by reference herein in its entirety.

FIELD OF THE INVENTION

The present invention relates to a workpiece image generation device, and more particularly, to a workpiece image generation device configured to generate a surface image robust against illumination by image selection and change of the position/attitude relationship between a workpiece and the illumination.

DESCRIPTION OF THE RELATED ART

Results of machining are analyzed by capturing images of a workpiece machined by a manufacturing machine such as a machine tool and quantitatively analyzing the captured images. An imaging device attached to the manufacturing machine or its peripheral device is used to capture the workpiece images. In order to then obtain good analysis results from the workpiece images, it is important to capture images that clearly indicate the surface state of the workpiece. In order to obtain high-quality learning data used for machine learning or the like, in particular, it is necessary to capture images with reduced unevenness in brightness, less glare from a light source, and the like due to the position of the light source.

As a conventional technique for capturing images of an object, an image processing device is disclosed in, for example, Japanese Patent Application Laid-Open No. 05-292503. This device images one and the same object at varied angles and performs addition processing, thereby enabling image processing less affected by extraneous light and surface reflection and accurate recognition determination processing. Moreover, Japanese Patent Application Laid-Open No. 2003-130993 discloses a device that alternately lights a plurality of illuminations to synthesize partial images with no glare in order to obtain drum surface images without glare.

When the workpiece is imaged, images are affected by complicated surface shapes of surrounding light sources and the workpiece. Therefore, it is not easy to clearly image the surface state of the workpiece. If the technique disclosed in Japanese Patent Application Laid-Open No. 05-292503 is used to image the entire workpiece having the complicated surface shape, for example, it is necessary to capture an appropriate number of images at appropriate imaging angles and process the images. However, no guideline is issued to specify the number of images to be captured and the imaging angles for such a surface shape. Moreover, the technique disclosed in Japanese Patent Application Laid-Open No. 05-292503 involves a problem that feature portions of the images inevitably degenerate as the image addition processing is repeated.

In order to image the entire workpiece having the complicated surface shape by using the technique disclosed in Japanese Patent Application Laid-Open No. 2003-130993, on the other hand, there are problems that a large number of illuminations are required and setting of the partial areas with glare from the light source is so rough that suitable area division for the imaging of the complicated surface shape cannot be achieved.

SUMMARY OF THE INVENTION

The object of the present invention is to provide a workpiece image generation device configured to generate a surface image robust against illumination by image selection and change of the position/attitude relationship of an imaging device relative to a workpiece.

A workpiece image generation device of the present invention solves the above problems by, for example, rotating a workpiece to capture a plurality of images, while changing the position/attitude relationship of an imaging device relative to the workpiece (or of a light source relative to the workpiece), and selecting and synthesizing an optimal image for each area to generate an image in which all areas are clear, in order to establish an appropriate relationship between the surface shape of the workpiece and the influence of the light source. The workpiece image generation device of the present invention is a device that generates an entire workpiece image in an optimal illumination state by acquiring surface shape information indicative of the workpiece surface shape from information on machining of the workpiece, dividing a surface area of the workpiece into partial areas based on the acquired surface shape information, acquiring a plurality of images by imaging the workpiece surface area, while changing the position/attitude relationship of the imaging device relative to the workpiece (or of the light source relative to the workpiece), and selecting and synthesizing partial images with an appropriate luminance, not too high and not too low, for each partial area from the obtained group of images.

One aspect of the present invention is a workpiece image generation device configured to generate an image of a surface of a workpiece captured by an imaging device and comprises a machining information acquisition unit configured to analyze information on machining of the workpiece and acquire surface shape information of the workpiece, an area division unit configured to virtually divide a surface area of the workpiece into partial areas based on the surface shape information, an image acquisition unit configured to acquire a plurality of images of the workpiece captured with different angles of irradiation on the workpiece as viewed from the imaging device, an area image selection unit configured to extract partial images individually from the plurality of images of the workpiece acquired by the image acquisition unit, based on the partial areas of the surface area of the workpiece divided by the area division unit, and select partial images corresponding to the individual partial areas from the plurality of extracted partial images, an image synthesis unit configured to generate a composite image of the workpiece obtained by synthesizing the partial images selected by the area image selection unit, and a composite image output unit configured to output the composite image of the workpiece.

Another aspect of the present invention is a workpiece image generation method for generating an image of a surface of a workpiece captured by an imaging device and comprises a first step of analyzing information on machining of the workpiece and acquiring surface shape information of the workpiece, a second step of virtually diving a surface area of the workpiece into partial areas based on the surface shape information, a third step of acquiring a plurality of images of the workpiece captured with different angles of irradiation on the workpiece as viewed from the imaging device, a fourth step of extracting partial images individually from the plurality of images of the workpiece acquired in the third step, based on the partial areas of the surface area of the workpiece, and selecting partial images corresponding to the individual partial areas from the plurality of extracted partial images, a fifth step of generating a composite image of the workpiece obtained by synthesizing the partial images selected in the fourth step, and a sixth step of outputting the composite image of the workpiece.

According to the present invention, an image of a workpiece captured in an optimal irradiation state can be acquired for each part of the workpiece without regard to the surface shape of the workpiece.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
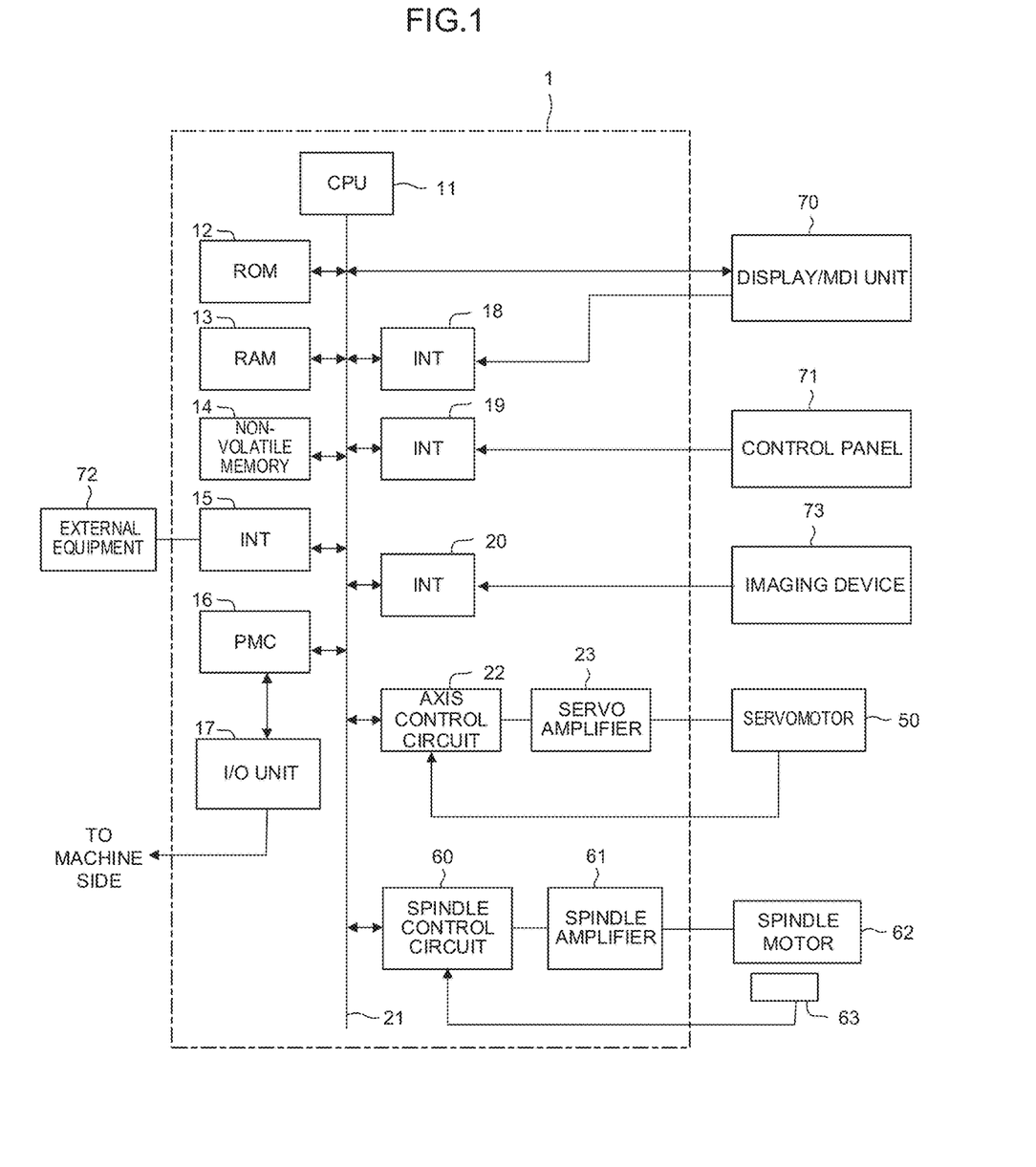
FIG. 1 is a schematic hardware configuration diagram of a workpiece image generation device according to one embodiment.

FIG. 1 is a schematic hardware configuration diagram showing the principal part of a workpiece image generation device according to one embodiment of the present invention. A workpiece image generation device 1 can be implemented as a control device for controlling a manufacturing machine. Moreover, the workpiece image generation device 1 can be implemented as a personal computer located together with the control device for controlling the manufacturing machine or a computer, such as a cell computer, host computer, or cloud server, connected to the control device through a network. FIG. 1 shows an example of a case where the workpiece image generation device 1 is implemented as the control device for controlling the manufacturing machine.

A CPU 11 of the workpiece image generation device 1 according to the present embodiment is a processor for generally controlling the workpiece image generation device 1. The CPU 11 reads out system programs stored in a ROM 12 through a bus 21 and controls the entire workpiece image generation device 1 according to the system programs. A RAM 13 is loaded with temporary calculation data and display data, various data input through a display/MDI unit 70 (described later), and the like.

A non-volatile memory 14 is constructed as a memory whose storage state can be maintained even when the workpiece image generation device 1 is powered off by using SSDs or SRAMs that are backed up by batteries (not shown), for example. The non-volatile memory 14 is stored with images of a workpiece to be processed, in addition to programs read through an interface 15 or programs input through the display/MDI unit 70 (described later). The programs stored in the non-volatile memory 14 may be developed in the RAM 13 during use. Moreover, various algorithms required for image processing and system programs for performing other necessary processing are previously written in the ROM 12.

The interface 15 is an interface for connecting the workpiece image generation device 1 and external equipment 72 such as an adapter. Programs and various parameters are read in from the side of the external equipment 72. Moreover, an external storage means can be stored with data such as programs edited in the workpiece image generation device 1 and processed images through the external equipment 72. A PMC (programmable machine controller) 16 controls peripheral devices (e.g., an actuator such as a robot hand for tool change) of the manufacturing machine by outputting signals to them through an I/O unit 17 according to a sequential program incorporated in the workpiece image generation device 1. Furthermore, on receiving signals from various switches of a control panel on the main body of the manufacturing machine, the PMC 16 performs necessary signal processing and then delivers the signals to the CPU 11.

The display/MDI unit 70 is a manual data input device equipped with a display, keyboard and the like, and an interface 18 receives commands and data from the keyboard of the display/MDI unit 70 and delivers them to the CPU 11. An interface 19 is connected to a control panel 71 equipped with a manual pulse generator and the like used to manually drive axes.

An axis control circuit 22 for controlling the axes of the manufacturing machine receives a movement command amount of each axis from the CPU 11 and outputs a command for the axis to a servo amplifier 23. On receiving this command, the servo amplifier 23 drives a servomotor 50 for moving the axes of the manufacturing machine. The servomotor 50 for the axes has a position/speed detector built-in and feeds back a position/speed feedback signal from this position/speed detector to the axis control circuit 22, thereby performing position/speed feedback control.

In the hardware configuration diagram of FIG. 1, the axis control circuit 22, servo amplifier 23, and servomotor 50 are each shown as being only one in number. Actually, however, these elements are provided corresponding in number to the feed axes of the manufacturing machine of each system to be controlled.

A spindle control circuit 60 receives a spindle rotation command for the manufacturing machine and outputs a spindle speed signal to a spindle amplifier 61. On receiving this spindle speed signal, the spindle amplifier 61 rotates a spindle motor 62 of the manufacturing machine at a commanded rotational speed, thereby driving a tool. A position coder 63 is connected to the spindle motor 62. The position coder 63 outputs feedback pulses in synchronism with the rotation of a spindle and the feedback pulses are read by the CPU 11.

The workpiece image generation device 1 is connected with an imaging device 73 through an interface 20. The imaging device 73 is used to acquire images of the workpiece obtained by imaging the workpiece and is installed in such a manner that its position and attitude relative to the workpiece, for example, are changeable. For example, the imaging device 73 may be located so as to be able to image the workpiece placed on a table (not shown) being rotated and translated relative to the imaging device 73 and perform imaging while changing the position/attitude relationship of the imaging device 73 to the workpiece, based on a command from the CPU 11 through the interface 20. Moreover, for example, the imaging device 73 may be attached to the tip of a robot (not shown) and located near the manufacturing machine. In this case, the workpiece image generation device 1 may be enabled to output a command to the robot to change the position/attitude relationship of the imaging device 73 to the workpiece.

Figure 2:
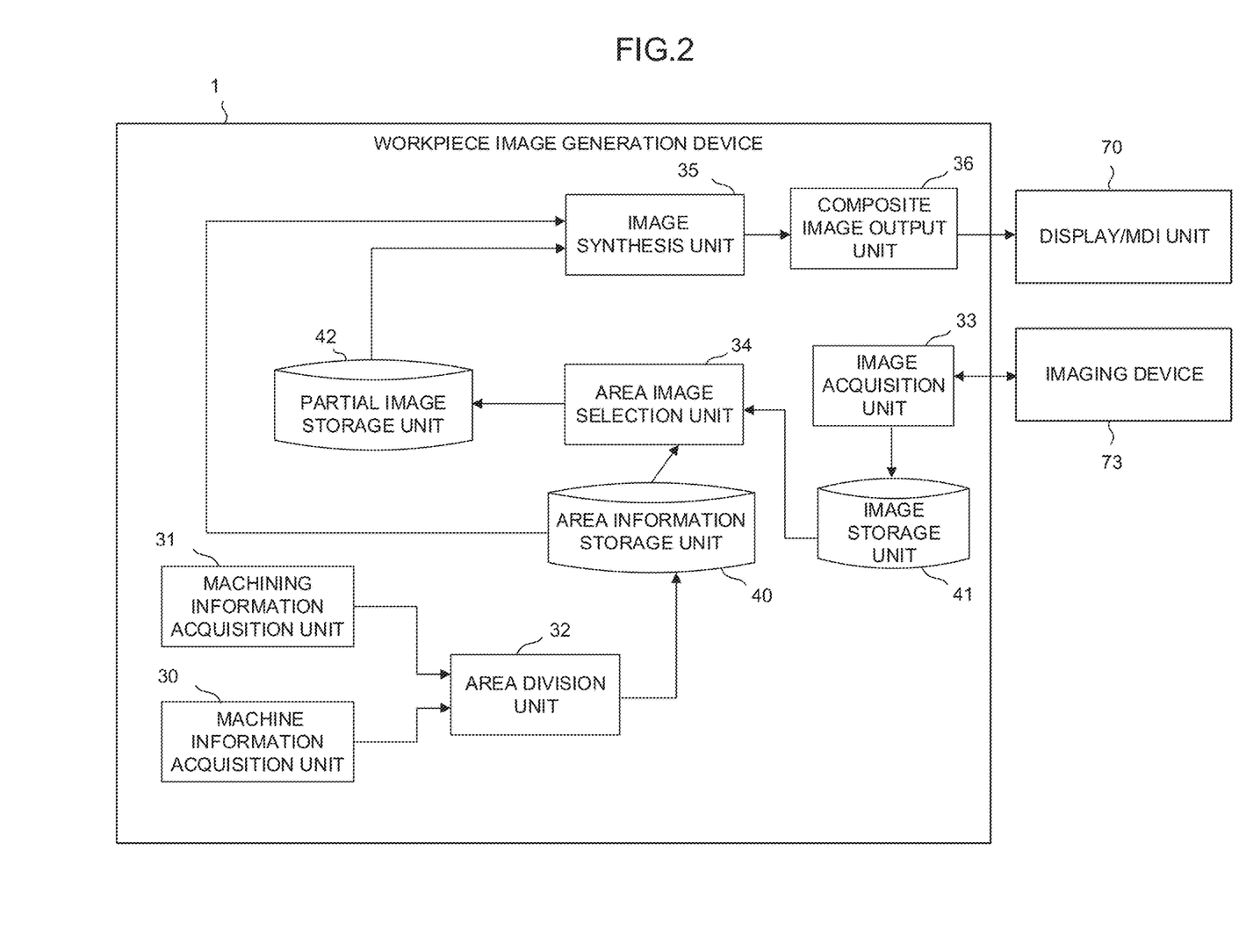
FIG. 2 is a schematic functional block diagram of the workpiece image generation device according to the one embodiment.

FIG. 2 is a schematic functional block diagram of the workpiece image generation device 1 according to the one embodiment of the present invention. Each of functional blocks shown in FIG. 2 is implemented as the CPU 11 of the workpiece image generation device 1 shown in FIG. 1 executes the system programs and controls operations of the individual parts of the workpiece image generation device 1.

The workpiece image generation device 1 of the present embodiment comprises a machine information acquisition unit 30, machining information acquisition unit 31, area division unit 32, image acquisition unit 33, area image selection unit 34, image synthesis unit 35, and composite image output unit 36. Also, an area information storage unit 40, image storage unit 41, and partial image storage unit 42 are secured on the non-volatile memory 14. The area information storage unit 40 stores area information for dividing each workpiece image into areas. The image storage unit 41 stores images captured by the imaging device 73. The partial image storage unit 42 stores partial images obtained by dividing each workpiece image.

The machine information acquisition unit 30 is a functional means for acquiring information related to the manufacturing machine for workpiece machining and its peripheral devices. The machine information acquisition unit 30 acquires the initial position of the imaging device 73 relative to at least the manufacturing machine and the workpiece as reference position/attitude information on a reference position/attitude. The machine information acquisition unit 30 may be configured to also acquire an illumination position relative to the manufacturing machine together.

The machining information acquisition unit 31 analyzes information on machining, such as machining conditions executed when the workpiece is machined and a machining program, and acquires surface shape information indicative of the shape of a surface area of the workpiece based on the results of the analysis. If the manufacturing machine is a machine tool having straight axes only, for example, the machining information acquisition unit 31 may be configured to calculate the coordinates of the tool tip point at the time of machining, based on the machining program and information on the tool, and to create and acquire the surface shape information of the finally machined workpiece, based on information on the calculated tool tip point and the tool information. Since the surface area shape of the workpiece machined according to the machining program varies depending on the method of workpiece machining, the machining information acquisition unit 31 creates and acquires the surface shape information of the workpiece by an analysis method corresponding to the machining method.

The area division unit 32 is a functional means for dividing the workpiece surface area into partial areas, based on the reference position/attitude information acquired by the machine information acquisition unit 30 and surface shape information of the workpiece acquired by the machining information acquisition unit 31, and storing area division information, obtained as a result of the division, into the area information storage unit 40. The area division unit 32 obtains a normal vector in a workpiece position corresponding to the position of each of virtual pixels, based on the surface shape information acquired for each virtual pixel by the machining information acquisition unit 31. This operation is based on the assumption that a workpiece image that can be captured when the imaging device 73 is in the reference position/attitude for the workpiece, for example, is a virtual image and that this virtual image is composed of virtual pixels of substantially the same size as its pixels. Then, the area division unit 32 clusters a set of virtual pixels based on the direction of the obtained normal vector. Then, the area division unit 32 divides the workpiece surface by sorting individual clusters obtained by clustering the virtual pixels as the same partial areas.

Figure 3:
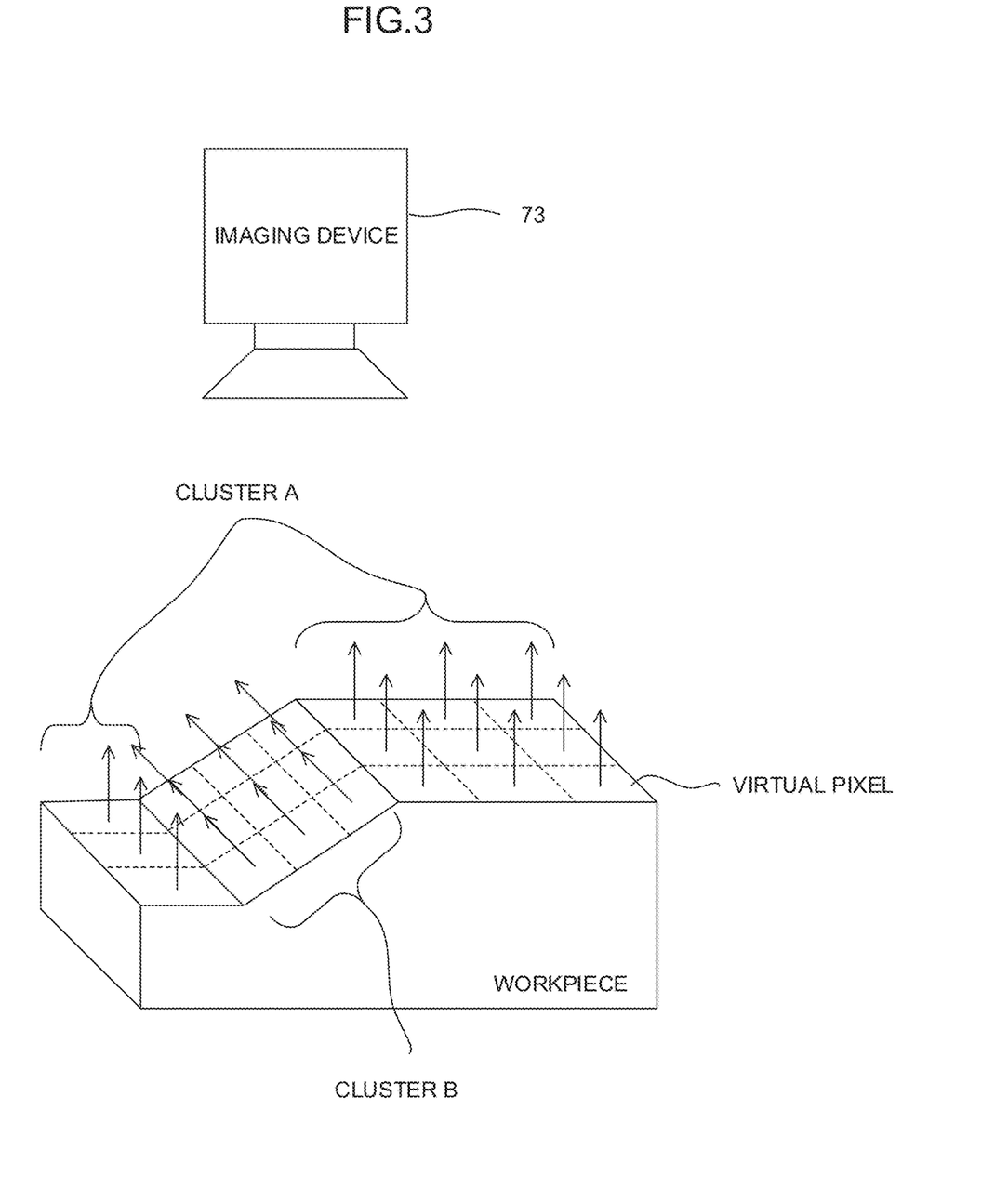
FIG. 3 is a diagram illustrating clustering of a virtual pixel executed by an area division unit.

FIG. 3 is a diagram illustrating the clustering executed by the area division unit 32. In FIG. 3, a state in which the imaging device 73 is located substantially over the workpiece when the rotation angle position of the table is at 0° is assumed to be the reference position/attitude. In this case, the area division unit 32 obtains the normal vector for each virtual pixel constituting the virtual image, in the workpiece position corresponding to the position of the virtual pixel. This operation is based on the assumption that an image of the surface area of the workpiece that can be captured if the image is assumed to be captured from above the workpiece by the imaging device 73 when the table position is at 0° is the virtual image. In FIG. 3, the virtual pixel is enlarged in drawing for ease of illustration. Actually, however, the size of the virtual pixel is substantially the same as that of the pixel of the image that can be captured by the imaging device 73. The workpiece illustrated in FIG. 3 involves virtual pixels having substantially upward normal vectors as illustrated and virtual pixels having substantially obliquely leftwardly upward normal vectors as illustrated, and these virtual pixels are clustered into clusters A and clusters B. The workpiece surface is divided into the partial areas as the virtual pixels belonging to the individual clusters are arranged as the partial areas.

For example, a conventional image area division algorithm based on the k-means method or the like may be used for the clustering of the virtual pixels by the area division unit 32. The area division unit 32 clusters the virtual pixels based on the directions of the normal vectors in the positions of the virtual pixels. If this is strictly executed, however, the surface area of the workpiece may possibly be subdivided into unnecessarily fine areas (e.g., if the surface area of the workpiece is curved), so that good results cannot sometimes be obtained in subsequent image syntheses. If the technique of the present invention is expected to be effectively applied to such workpiece shapes, a highly flexible clustering method may be used for the virtual pixel clustering such that, for example, other virtual pixels located near a reference virtual pixel can be handled as a single cluster rounded within such a range that the directions of the normal vectors are within a predetermined error range.

The image acquisition unit 33 is a functional means for acquiring the workpiece images from the imaging device 73 and storing them into the image storage unit 41. The image acquisition unit 33 captures and acquires a plurality of workpiece images while changing the angle of irradiation on the workpiece as viewed from the imaging device 73. In order to implement this image acquisition method, the image acquisition unit 33 acquires a plurality of workpiece images while changing, for example, the position/attitude of the imaging device 73 relative to the workpiece, and stores the acquired images into the image storage unit 41 after transforming them (two- or three-dimensional mapping transformation) so that they appear to be images captured when the imaging device 73 and the workpiece are in the reference position/attitude.

Figure 4:
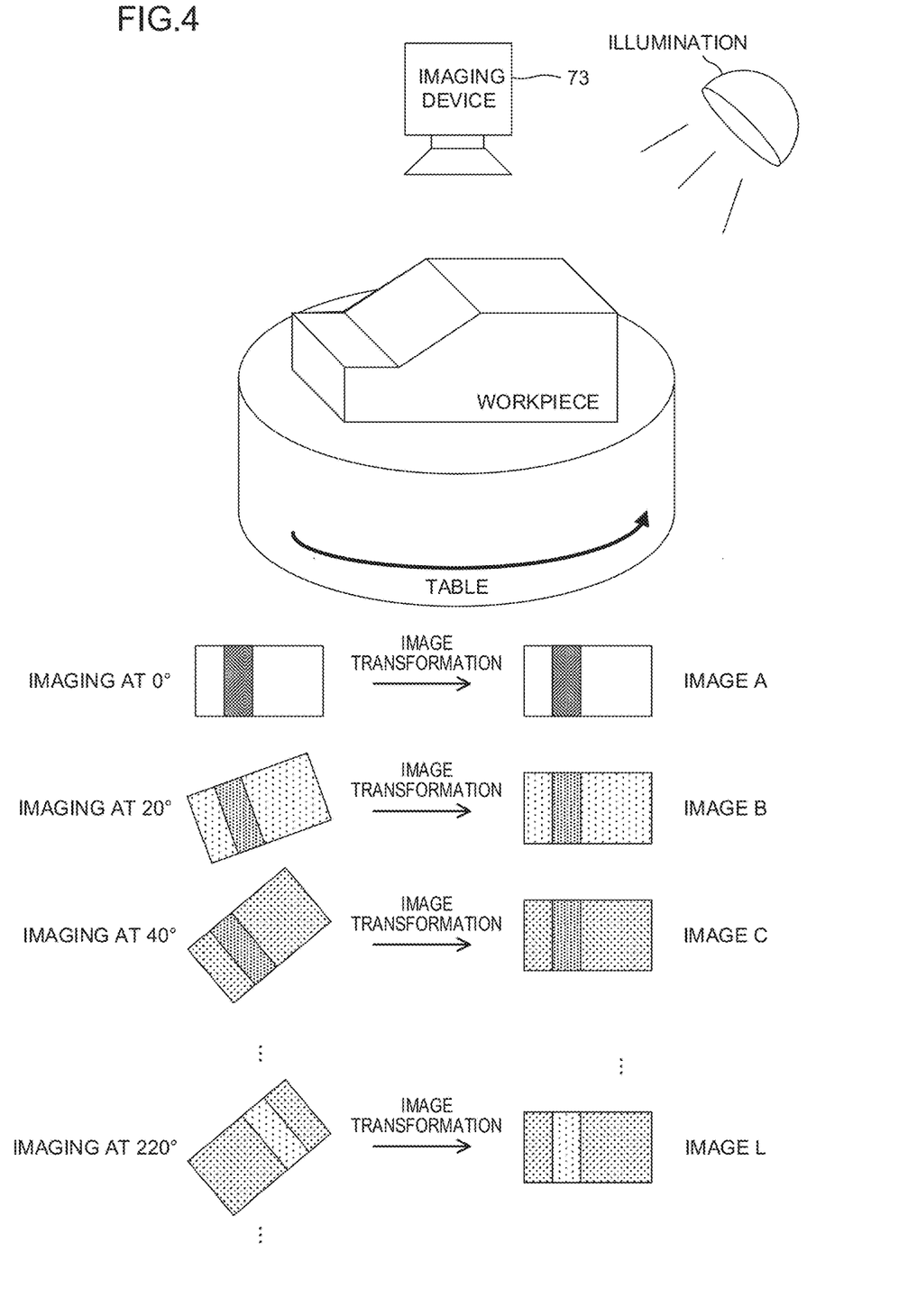
FIG. 4 is a diagram illustrating acquisition of images of a workpiece by an image acquisition unit.

FIG. 4 is a diagram illustrating the acquisition of the workpiece images by the image acquisition unit 33. The image acquisition unit 33 may be configured to capture and acquire a plurality of workpiece images while turning the table by each predetermined angle (e.g., 20°) at a time in the direction of the arrow shown in FIG. 4, for example (18 images are obtained by the turning by each 20° at a time). Since illumination light beams reflected at different angles by the individual parts of the workpiece surface are incident on the imaging device 73, corresponding portions of the workpiece in the individual images acquired by the image acquisition unit 33 are taken with different tints, luminances, and the like into the images. The acting position/attitude of the imaging device 73 relative to the workpiece and the number of images captured by the image acquisition unit 33 should preferably be fixed in advance by an experiment, computation by a simulator, or the like. What is important is that a plurality of positions and attitudes of the imaging device 73 for capturing the images relative to the workpiece include such a position/attitude of the imaging device 73 relative to the workpiece that the images can be captured with a predetermined quality for the individual partial areas of the workpiece (e.g., images with a brightness within an appropriate range, not unnecessarily high and not unnecessarily low, can be captured).

Figure 5:
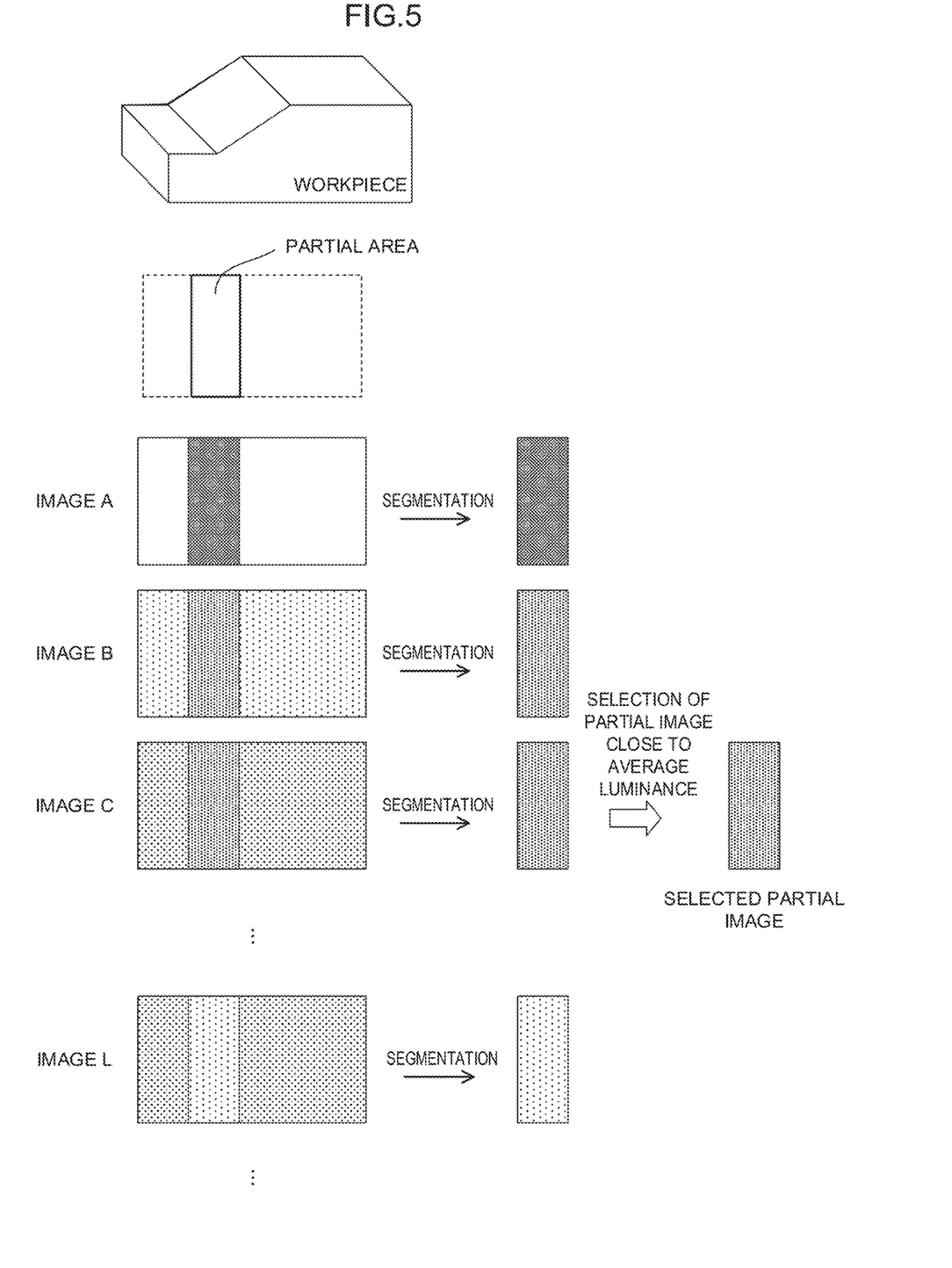
FIG. 5 is a diagram illustrating selection of partial images by an area image selection unit.

The area image selection unit 34 is a functional means for creating and selecting the partial images corresponding to the individual areas, based on the area division information stored in the area information storage unit 40 and the workpiece images stored in the image storage unit 41, and storing the selected partial images corresponding to the individual partial areas into the partial image storage unit 42. As shown in FIG. 5, for example, the area image selection unit 34 may be configured to segment the partial images corresponding to the individual partial areas of the captured workpiece images from the workpiece images stored in the image storage unit 41, compare the luminances of the segmented partial areas, and select a partial image with a luminance close to an average luminance of all the partial images. Moreover, the area image selection unit 34 may be configured to select an image with a luminance closest to a predetermined criterion from a plurality of partial images.

The image synthesis unit 35 creates a composite image of the workpiece that joins the individual partial images, based on the area division information stored in the area information storage unit 40 and the partial images stored in the partial image storage unit 42. The workpiece image synthesized by the image synthesis unit 35 becomes an image that appears to be an image captured when the imaging device 73 is in the reference position/attitude relative to the workpiece. When the image synthesis unit 35 synthesizes the partial images, it can variously handle the boundaries of each partial image depending on adaptive cases. The image synthesis unit 35 may be configured to directly paste the partial images together (without regard for the discontinuity of the boundaries) or synthesize the image after processing the individual partial images so that the difference in luminance between the boundaries of the partial images is minimized.

The composite image output unit 36 is a functional means for outputting the workpiece image synthesized by the image synthesis unit 35. The composite image output unit 36 may be configured to display-output the workpiece image synthesized by the image synthesis unit 35 to the display/MDI unit 70 or record-output the workpiece image to the non-volatile memory 14 or the external equipment 72. Moreover, the composite image output unit 36 may be configured to send-output the workpiece image synthesized by the image synthesis unit 35 to a computer, such as a host computer or a cloud computer, connected through a network.

According to the above configuration, the workpiece image can be obtained by synthesizing images captured in optimal light source positions for the individual partial areas of the workpiece surface. In the workpiece image generation device of the present invention, the partial images segmented from the captured images are directly used without performing such processing as averaging of a plurality of images for the same area of the workpiece image, so that fine features of the surface never degenerate. Thus, suitable workpiece images can be obtained as input data for a workpiece surface inspection or machine learning.

While an embodiment of the present invention has been described above, the invention is not limited to the above-described embodiment and may be suitably modified and embodied in various forms.

In the embodiment described above, for example, the image acquisition unit 33 is assumed to acquire a plurality of workpiece images while turning the table carrying the workpiece thereon by each predetermined angle at a time. Alternatively, however, a position/attitude of the imaging device 73 relative to the workpiece may be obtained in advance such that the workpiece image can be captured with an optimal luminance for each partial area by using a simulator, for example. In this way, the number of images to be captured can be reduced if the number of divided areas of the workpiece surface is small, for example.

Moreover, position/attitude relationships between the workpiece surface, the imaging device 73, and a light source (angle of irradiation on the workpiece surface as viewed from the imaging device 73) such that a predetermined workpiece surface can be captured with an optimal predetermined luminance by using a simulator or the like may be calculated in advance so that the images can be captured after the individual partial areas (workpiece surface) are brought to the calculated relationships with the imaging device 73 and the light source. In this way, the images can be efficiently captured with optimal luminances for the individual partial areas.

Furthermore, in capturing the workpiece image based on the results of the area division of the workpiece surface, the image acquisition unit 33 may be configured to observe luminance changes of the individual partial areas of the workpiece surface while changing the position/attitude of the imaging device 73 relative to the workpiece in a predetermined pattern so that the images can be captured in such a position/attitude that the luminance is optimal for each of the partial areas.

Furthermore, as an application of the above case, a device capable of capturing videos may be used as the imaging device 73 to capture the videos and store them into the image storage unit 41, while changing the position/attitude of the imaging device 73 relative to the workpiece so that the area image selection unit 34 can analyze the respective frames of the videos stored in the image storage unit 41, extract frames with optimal luminances for the individual partial areas, and create and select the partial images.

Moreover, in the embodiment described above, the image acquisition unit 33 is assumed to acquire a plurality of captured workpiece images while changing the position/attitude of the imaging device 73 relative to the workpiece. However, the technique of the present invention can also be suitably implemented by capturing a plurality of workpiece images while changing the light source position with the position/attitude of the imaging device 73 relative to the workpiece fixed.

Furthermore, in the illustrated example of the embodiment described above, the structure for obtaining the composite image of the workpiece is incorporated in the workpiece image generation device 1. However, a workpiece image generation method of the present invention need not be constructed in a single device provided that the processing performed by the individual functional means of the workpiece image generation device 1 can be performed in an appropriate order. For example, the technique of the present invention can also be implemented by installing processing performed by the machine information acquisition unit 30, machining information acquisition unit 31, area division unit 32, and the like on a CAD/CAM device or the control device of the machine tool, providing the image acquisition unit 33 on the control device of the robot, installing the area image selection unit 34, image synthesis unit 35, and composite image output unit 36 on the host computer, and connecting these units by a wired/wireless network so that necessary information can be exchanged.

While embodiments of the present invention have been described above, the invention is not limited to the above-described embodiments and may be suitably modified and embodied in other forms.

The invention claimed is:

1. A workpiece image generation device configured to generate an image of a surface of a workpiece captured by an imaging device, the workpiece image generation device comprising:
   a processor configured to
   analyze information on machining of the workpiece and acquire surface shape information of the workpiece,
   virtually divide a surface area of the workpiece into partial areas based on the surface shape information,
   acquire a plurality of images of the workpiece captured with different angles of irradiation on the workpiece as viewed from the imaging device,
   extract partial images individually from the acquired plurality of images of the workpiece, based on the divided partial areas of the surface area of the workpiece, and select partial images corresponding to the individual partial areas from the plurality of extracted partial images,
   generate a composite image of the workpiece obtained by synthesizing the selected partial images; and
   output the composite image of the workpiece.

2. The workpiece image generation device according to claim 1, wherein the processor is further configured to acquire the plurality of images of the workpiece captured with the imaging device in different positions and attitudes relative to the workpiece.

3. The workpiece image generation device according to claim 1, wherein processor is further configured to acquire the plurality of images of the workpiece captured with a light source in different positions relative to the workpiece.

4. The workpiece image generation device according to claim 1, wherein the angles of irradiation on the workpiece as viewed from the imaging device when the acquired plurality of images of the workpiece are captured are calculated in advance to enable the workpiece images to be captured with a predetermined reference luminance.

5. The workpiece image generation device according to claim 1, wherein an angle of irradiation on the workpiece as viewed from the imaging device such that the predetermined reference luminance is obtained is calculated in advance, and the processor is further configured to acquire the plurality of images of the workpiece captured at the angle of irradiation concerned for each of the partial areas.

6. The workpiece image generation device according to claim 1, wherein the processor is further configured to select a partial image with a luminance close to an average luminance of the partial images as a partial image corresponding to each of the partial areas, among the plurality of extracted partial images.

7. The workpiece image generation device according to claim 1, wherein the processor is further configured to select a partial image with a luminance close to a predetermined reference luminance as a partial image corresponding to each of the partial areas, among the plurality of extracted partial images.

8. The workpiece image generation device according to claim 1, wherein the processor is configured to virtually divide the surface area of the workpiece into the partial areas based on the direction of a normal vector in each position of the workpiece.

9. The workpiece image generation device according to claim 1, wherein corresponding portions of the workpiece in the acquired plurality of images are taken with at least one of different tints or different luminances into the plurality of images.

10. The workpiece image generation device according to claim 2, wherein the processor is further configured to
   cluster virtual pixels on the surface area of the workpiece, based on a direction of a normal vector at each of virtual pixels, and
   divide the surface area of the workpiece by sorting individual clusters obtained by clustering the virtual pixels as the same partial areas.

11. The workpiece image generation device according to claim 10, wherein the processor is further configured to
   cluster a first group of virtual pixels having normal vectors oriented in a first direction into a first cluster,
   cluster a second group of virtual pixels having normal vectors oriented in a second direction into a second cluster, and
   divide the surface area of the workpiece into the partial areas as the first group and second group of virtual pixels belonging to the first and second clusters are arranged as the partial areas.

12. A workpiece image generation method executed on a workpiece image generation device for generating an image of a surface of a workpiece captured by an imaging device, the workpiece image generation method executed on a workpiece image generation device comprising:
   a first step of analyzing information on machining of the workpiece and acquiring surface shape information of the workpiece;
   a second step of virtually diving a surface area of the workpiece into partial areas based on the surface shape information;
   a third step of acquiring a plurality of images of the workpiece captured with different angles of irradiation on the workpiece as viewed from the imaging device;
   a fourth step of extracting partial images individually from the plurality of images of the workpiece acquired in the third step, based on the partial areas of the surface area of the workpiece, and selecting partial images corresponding to the individual partial areas from the plurality of extracted partial images;

a fifth step of generating a composite image of the workpiece obtained by synthesizing the partial images selected in the fourth step; and a sixth step of outputting the composite image of the workpiece.

\* \* \* \* \*